United States Patent [19]

Murphy, II

[11] 4,385,703
[45] May 31, 1983

[54] FRY BASKET SHAKER DEVICE

[76] Inventor: Patrick J. Murphy, II, 245 Newhill Ave., Somerset, Mass. 02726

[21] Appl. No.: 249,240

[22] Filed: Mar. 30, 1981

[51] Int. Cl.³ .............................................. B07B 1/28
[52] U.S. Cl. .................................. 209/674; 209/234; 209/373; 209/315; 99/408
[58] Field of Search .............. 209/674, 682, 235, 373, 209/374, 315, 319, 341, 357; 222/460; 99/408; 118/17, 22

[56] References Cited

U.S. PATENT DOCUMENTS

| | | | |
|---|---|---|---|
| 818,230 | 4/1906 | Chapman | 209/357 X |
| 2,635,527 | 4/1953 | Overbeck et al. | 99/408 |
| 2,694,515 | 11/1954 | Green | 222/460 X |
| 2,716,938 | 9/1955 | Smith | 99/408 |
| 2,716,939 | 9/1955 | Smith | 99/408 |
| 3,129,167 | 4/1964 | Frangos | 209/315 |
| 3,804,246 | 4/1974 | Ljungquist | 209/315 X |

Primary Examiner—Allen N. Knowles
Attorney, Agent, or Firm—Salter & Michaelson

[57] ABSTRACT

An apparatus is disclosed for shaking pieces of breaded food to remove excess breading intermixed therewith and for sifting said breading to recover reusable portions thereof. The breaded pieces of food are placed in a fryer basket which is positioned within a shaker housing, and the housing and the basket are then mechanically shaken to cause excess breading intermixed with the pieces of food to fall onto a screen located below the basket within the housing. The excess breading is sifted by the screen and the reusable portions of the breading are then recovered in a recover pan located therebelow.

9 Claims, 3 Drawing Figures

FRY BASKET SHAKER DEVICE

BACKGROUND OF THE INVENTION

The apparatus of the instant invention relates to the preparation of food for deep frying.

In many restaurant kitchens a common food preparation process involves the deep frying of pieces of food in very hot fat. Oftentimes prior to frying the food pieces, a flour based breading is applied as a coating thereon which forms a crisp outer layer on the individual pieces of food when they are fried. The outer layer thus formed adds flavor to the food and also tends to help seal in the food's natural flavor and juices during the cooking process. As a result, food cooked in this manner if properly prepared is very flavorful and has found great favor with the consuming public.

The instant invention relates to an apparatus which facilitates the breading process in preparing food for deep frying. Normally when pieces of food are breaded, they are first dipped in a wash consisting of milk and eggs or natural juices from the food. The food pieces are then removed from the wash and placed in a breading pan containing breading which generally consists of a mixture of various flours, cornflour, levening, baking powder and salt, and then vigorously mixed in the breading pan to assure that each piece is well coated with the breading mixture. Thereafter the food pieces are removed from the breading pan and placed in a wire shaker basket where they are again vigorously shaken to remove excess breading intermixed therewith. Finally, the food pieces are transferred from the wire shaker basket to a fryer basket and emersed in deep fat for cooking.

While the food preparation technique described hereinabove can result in very flavorful and tasty food, unfortunately such a process is very time consuming and in most instances very messy. These drawbacks are of particular concern in the restuarant business where customer service and cleanliness are of prime importance and where the recovery of the excess usable breading can result in considerable savings. The instant invention avoids problems heretofore experienced by providing an apparatus for mechanically shaking the pieces of food after they have been dipped in the breading to remove the excess breading intermixed therewith, while at the same time mechanically shanking the excess breading to sift it and to recover reusable portions thereof.

Some prior known mechanical devices have been used in breading food preparation operations and examples of this kind of apparatus are illustrated in the U.S. patents to Gordon, U.S. Pat. Nos. 3,529,277 and 3,855,965 which represent the best prior art that pertains to the subject invention and of which the applicant is aware. However, neither of these patents illustrate an apparatus which can be used to both shake pieces of food to remove excess breading intermixed therewith and to shake the excess breading to sift it and recover reusable portions thereof. As will be described hereinafter, the apparatus of the instant invention represents a substantial improvement over the prior known apparatus and has significant commercial value and utility in both restaurant and institutional food preparation operations.

SUMMARY OF THE INVENTION

The apparatus of the instant invention relates to the preparation of food for deep frying. More particularly the instant invention provides an apparatus for shaking breaded pieces of food to remove excess breading intermixed therewith and for sifting the excess breading to recover reusable portions thereof.

The present invention eliminates certain time consuming and tedious manual steps of preparing food pieces for deep frying by providing a device which mechanically shakes the breaded pieces of food in fryer baskets, the baskets thereafter being placed directly into hot liquid fat. The apparatus as herein disclosed has a main housing on which one or more heavy wire mesh fryer baskets are removably mounted. As the pieces of food are processed, they are removed from the breading pan and placed directly into a fryer basket located in the housing. The housing and the basket are then mechanically shaken causing excess breading intermixed with the pieces of food to fall therefrom. Thereafter the basket and the pieces of food contained therein are removed from the housing and placed directly in the hot liquid fat for deep frying.

One problem that is inherent in the preparation of breaded food for frying occurs as the pieces of food are transferred from the prepared wash to the breading pan, wherein a certain amount of excess wash adheres to the pieces of food. The excess wash accumulating on the food pieces causes the formation of small gummy breading balls in the breading mixture which must be removed from the mixture by sifting it at regular intervals. Accordingly, it is a further function of the apparatus of the instant invention to mechanically sift the breading mixture to remove the unwanted breading balls. In order to effect this sifting function, a sifting screen is provided beneath the shaker baskets within the main housing of the apparatus. When the main housing is mechanically shaken, this screen is also shaken so that as the excess breading falls from the shaker baskets, the breading falls onto the sifting screen where it is shaken and then sifted through the screen. The reusable portions of the breading fall through the screen and into a chute for recovery in a recovery pan positioned at the bottom of the apparatus.

Accordingly, it is an object of the instant invention to provide an apparatus for shaking pieces of breaded food to remove excess breading intermixed therewith while at the same time shaking the excess breading that falls therefrom for sifting and recovering reusable portions thereof.

A further object of the instant invention is to provide an apparatus for expediting and facilitating the preparation of breaded pieces of food for deep frying.

Other objects, features and advantages of the invention shall become apparent as the the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
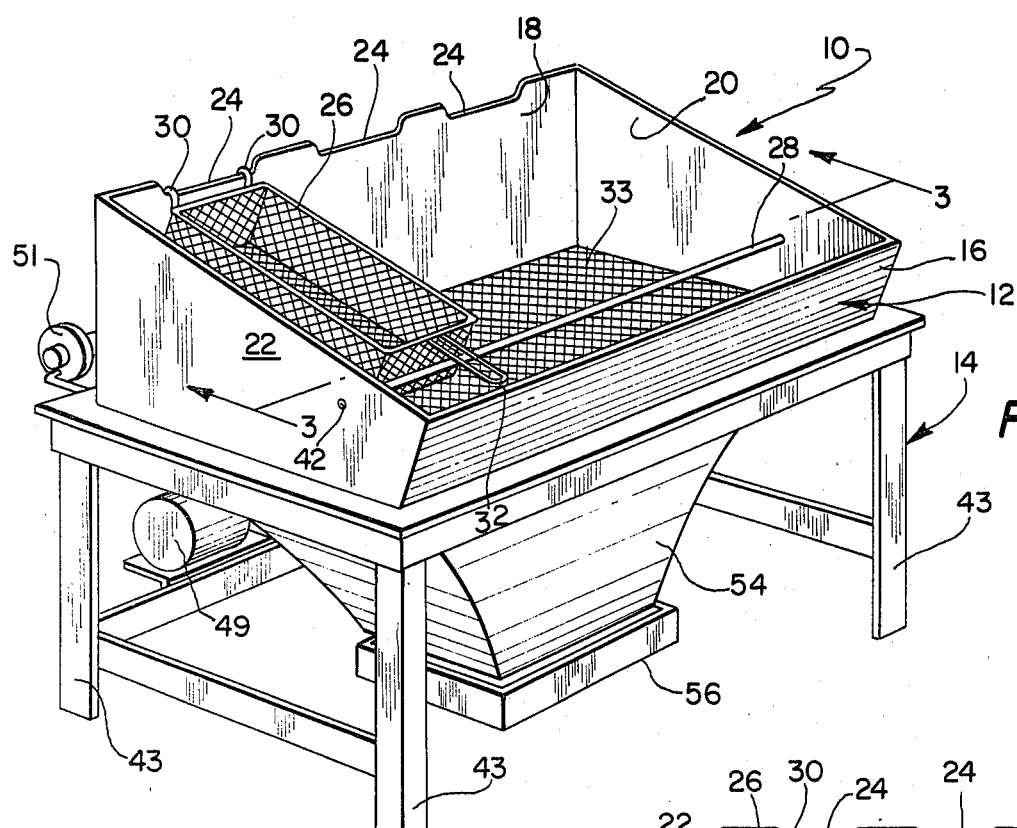
FIG. 1 is a perspective view of the apparatus embodied in the instant invention.
Figure 2:
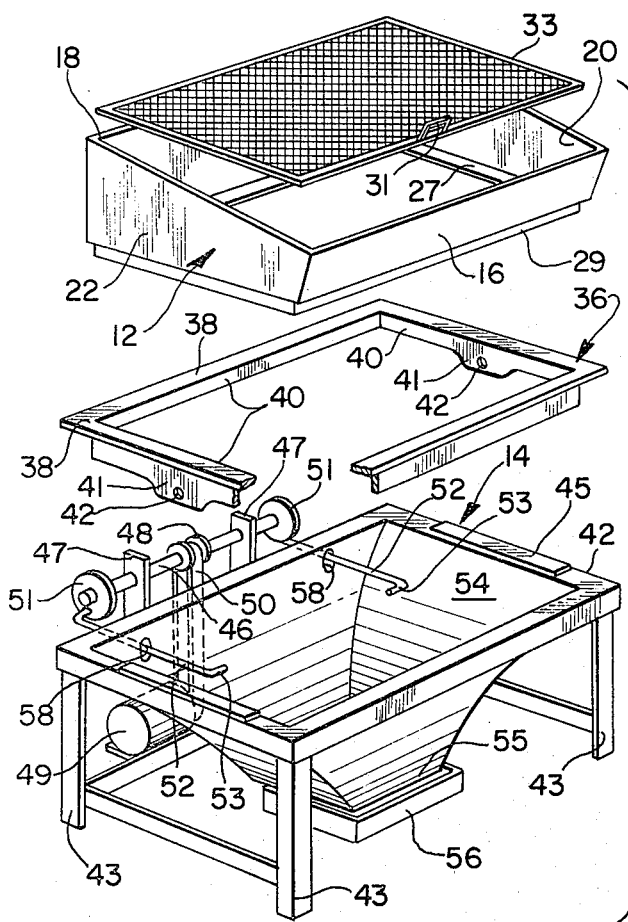
FIG. 2 is an exploded perspective view of the apparatus of the instant invention as shown in FIG. 1 but without the shaker baskets mounted thereon.
Figure 3:
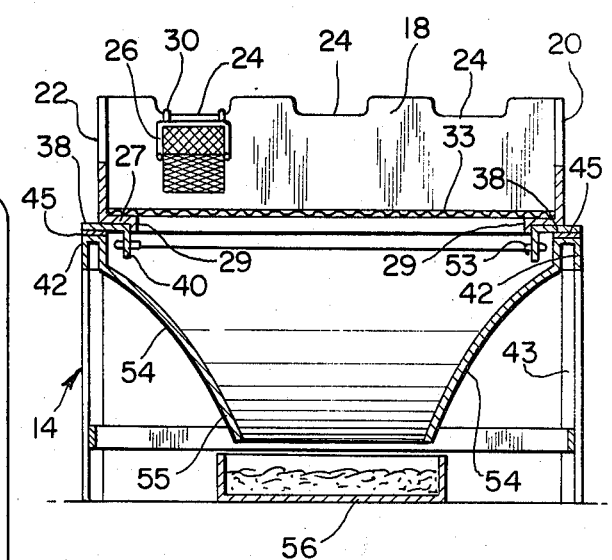
FIG. 3 is a side sectional view of the apparatus of the instant invention taken along line 3—3 in FIG. 1.

Referring now to the drawing, and particularly to FIG. 1, the apparatus of the instant invention is illustrated and generally indicated at 10. As shown in FIG. 1, the apparatus 10 includes a main shaker housing generally indicated at 12 which is mounted on a support frame generally indicated at 14. The main shaker housing 12 is formed in a box-like structure having a front wall 16, a rear wall 18 and a pair of opposed side walls 20 and 22. As illustrated in FIGS. 1 and 2, the rear wall 18 and side walls 20 and 22 are substantially vertical, while the front wall 16 is inclined slightly forwardly from the vertical. As will be further noted, the rear wall 18 is somewhat greater in height than the front wall 16, and the side walls 20 and 22 which extend between front wall 16 and rear wall 18 have somewhat of a tapered construction that imparts a wedge-shaped appearance to the housing 12. A plurality of elongated notches 24 are formed in the upper edge of the rear wall 18 and as will be described are provided for mounting shaker baskets within the housing 12, one of the shaker baskets being indicated at 26. The shaker housing walls 16, 18, 20 and 22 all have a reduced horizontal flange 27 joined to the lowermost ends thereof, downwardly turned flanges 29 being joined to the reduced flanges 27.

As shown in FIG. 1, an elongated rod 28 is located within the housing 12 and extends between the forward upper portions of the side walls 20 and 22 and as will be described hereinafter cooperates with the rear wall 18 to support the shaker basket 26 in an inclined disposition within the housing 12. The shaker basket 26 is of conventional fryer basket construction and is suitable for immersion in hot liquid fat. For this purpose the basket 26 is formed in a substantially elongated rectangular configuration in longitudinal section and is constructed of a suitable heavy wire mesh material. Wire hooks 30 extend from the rear of the upper frame of the basket 26 for mounting the basket on the rear wall 18 and a handle 32 extends forwardly from the opposite end thereof. The handle 32 overlies the rod 26 and projects therebeyond to provide convenient access thereto for lifting the basket from the housing 12. As further seen in FIG. 1, the housing is of sufficient width to accomodate additional baskets therein as necessary, the notches 24 as formed in the rear wall 18 receiving hooks 30 of the other baskets in the manner as illustrated. It is seen that the shaker basket 26 is a conventional fryer basket which may be immersed directly in hot liquid fat. While this type of basket is normally too heavy and cumbersome for use as a shaker basket for a mannual shaking operation, as will be evident from the description following hereinafter, the weight of the basket is not significant since the shaking operation is carried out mechanically. Consequently, with the apparatus as herein disclosed, breaded pieces of food are transferred directly from a breading pan to a fryer basket 26 for shaking and then frying, thereby resulting in the elimination of the preparation step of transferring the breaded pieces of food from a shaker basket to a fryer basket.

Referring again to the drawing and particularly to FIG. 2, the housing 12 is shown including a wire mesh bottom sifting screen 33 that forms the bottom wall of the housing. The screen 33 is removably positioned in the housing 14 and rests on the flange 27 that extends inwardly from the bottom edges of walls 16, 18, 20 and 22. The screen 33 is used to sift excess breading therethrough that falls from the food pieces located in the basket 26 and is therefore removably positioned within housing 12. A sifting tab 31 is secured to the frame of the screen 33 and enables the screen to be conveniently lifted from the housing 12 for cleaning. It is also seen that coarse breading balls that are formed in the breading operation and that fall on the screen 33 are removable from the housing 12 and discarded by lifting of the screen from the housing.

In order to shake the excess breading from the food pieces, a rectangular shaker frame generally indicated at 36 is provided and as shown in FIG. 2 is located beneath the housing 12 and is received on and is supported by the support frame 14. The shaker frame 36 receives the lower flange 29 of the housing 12 and for this purpose includes a substantially horizontal frame portion 38 to which a substantially vertical lower flange portion 40 is joined. Integrally joined to the sides of the lower flange portion 40 and projecting therebelow are extensions 41 in which holes 42 are formed. The support frame 14 includes a top frame member 43 to the corners of which vertical legs 44 are secured. Lower horizontal struts are fixed to legs and cooperate therewith to provide a rigid support for the support frame 43. Nylon pads 45 are fixed to the upper surface of the sides of the support frame 43 and receive the frame portion 38 of the shaker frame 36 in sliding relation thereon. It is seen that the lateral dimensions of top frame member 43 are substantially the same as the outer dimensions of the support frame 43 of the shaker frame 36. The lower flange portion 40 of the shaker frame 36 thus is received within the support frame 43, the sides of the frame portion 38 being received on the pads 45 for slidable relation thereon. For this purpose, the nylon pads 45 serve to reduce friction and wear between frame portion 38 and the upper surfaces of the support frame 43 during the shaking operation.

In order to provide for a reciprocating shaking movement of the shaker frame 36 and the housing 12 mounted thereon, a drive mechanism is provided and includes a drive shaft 46 which as shown in FIG. 2, is rotatably mounted in vertical bearing supports 47 that are secured to the rear of the frame 14 in any conventional manner. Mounted on drive shaft 46 is a pulley 48 that is driven by a motor 49 through a belt 50. A pair of drive discs 51 are concentrically mounted on the drive shaft 46, a shaker shaft 52 being attached to each of the drive discs in eccentric disposition and being reciprocated upon rotating movement thereof. The outer end of each shaft 52 terminates in an inwardly turned portion 53 which is received in a hole 42 of the flange portion 40 of the shaker frame 36, wherein rotation of the drive shaft 46 produces a corresponding reciprocating shaking movement of the shaker frame 36 and the shaker basket 12 mounted thereon. Thus it is seen that when the motor 48 is energized, a reciprocating shaking movement of the shaker housing 12 results together with the screen 33 and shaker basket 26, so that when breaded pieces of food are placed in the basket 26, they will also be shaken causing any excess breading thereon to fall therefrom onto the sifting screen for sifting therethrough. In order to recover the sifted breading, the support frame 14 has a bottom chute 54 mounted therebelow that extends from the top frame member 43 downwardly to a reduced lower end 55 to form a funnel for recovering the reusable portions of the excess breading. A recovery pan 56 is located below the reduced lower end 55 of the chute 54 so that as the breading is sifted through the screen 33 and into the chute 54 it is directed into the pan 56 for recovery. The recovery pan 56 has a configuration corresponding to that of the reduced lower end 55 of the chute 54 for receiving the sifted breading therethrough from the screen 33 and is removable from its position beneath the chute 54 so that the recovered portions of reusable breading may be removed from the apparatus 10 for reuse. As further seen in FIG. 2, oblong shaped openings 58 are formed in the rear wall of the chute 54 for receiving the reciprocating shafts 52 therethrough.

In use, the food pieces are first dipped in a wash and thereafter a breaded coating is applied thereto in the usual manner. The coated food pieces are placed in a shaker basket 26 which is mounted in place on the shaker housing 12. The motor 49 is then energized which produces a reciprocating shaking movement of the shaker frame 36 and shaker housing mounted thereon. The excess breading and any breading balls are then shaken onto the screen 33 and sifted therethrough into the chute 54 for deposit in the pan 56 and recovery therefrom. After the shaking operation is completed, the shaker basket 26 is placed in hot liquid oil for deep frying of the food pieces.

While there is shown and described herin certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for shaking pieces of breaded food to remove excess breading intermixed therewith and for sifting said breading to recover reusable portions thereof comprising:
  a. a main shaker housing having peripheral side walls and a bottom wall, said bottom wall being defined by a screen through which said breading is sifted;
  b. at least one fryer basket for containing pieces of breaded food therein, said basket being suitable for immersion in hot liquid fat for frying pieces of food contained therein and being removably mounted within said housing and formed with openings in the walls thereof to allow excess breading intermixed with said pieces of food to fall therethrough;
  c. means for supporting said housing in a manner for allowing shaking movement of said housing relative to said supporting means;
  d. means for shaking said housing and the fryer basket mounted therein, whereby the excess breading intermixed with said pieces falls through said openings in said basket so that said basket and the pieces contained therein can be removed from said housing and immersed in a fryer containing hot liquid fat to cook said pieces, and whereby the excess breading which falls through said openings in said basket is sifted by said bottom wall with the reusable portions thereof falling through said bottom wall; and
  e. means for containing and recovering said reusable portions as they fall from said bottom wall.

2. The apparatus as claimed in claim 1, said shaking means further comprising:
  a. a substantially horizontal drive shaft rotatably mounted on said supporting means;
  b. means for rotating said shaft;
  c. at least one circular disc concentrically mounted on said drive shaft;
  d. a substantially horizontal connecting rod positioned substantially perpendicular to said shaft, one end of said rod being connected to said disc in eccentric disposition therewith, the other end thereof being connected to said main housing, whereby rotation of said shaft causes reciprocal shaking movement of said housing and the shaker basket mounted therein.

3. The apparatus as claimed in claim 1, said recovering and containing means further comprising a funnel located below said shaker housing for receiving the sifted breading therein and a pan communicating with said funnel for receiving said sifted breading falling therethrough, said pan having a bottom wall and peripheral side walls and being removable from said apparatus for removing said reusable portions therefrom.

4. The apparatus as claimed in claim 1, said supporting means further comprising a support frame.

5. The apparatus as claimed in claim 1, said recovering and containing means further comprising a pan having a bottom wall and peripheral side walls said pan being removable from said apparatus for removing said reusable portions therefrom.

6. The apparatus as claimed in claim 2, said recovering and containing means further comprising a pan having a bottom wall and peripheral side walls, said pan being removable from said apparatus for removing said reusable portions therefrom.

7. The apparatus as claimed in claim 6, said supporting means further comprising a support frame.

8. The apparatus as claimed in claim 2, said supporting means further comprising a support frame.

9. In the apparatus of claim 1, said fryer basket being removably mounted in an inclined disposition within said housing.

* * * * *